US011016528B2

(12) United States Patent
Lin et al.

(10) Patent No.: US 11,016,528 B2
(45) Date of Patent: May 25, 2021

(54) FOLDABLE ELECTRONIC DEVICE

(71) Applicants: Che-Hsien Lin, Taipei (TW); Che-Hsien Chu, Taipei (TW)

(72) Inventors: Che-Hsien Lin, Taipei (TW); Che-Hsien Chu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/698,938

(22) Filed: Nov. 27, 2019

(65) Prior Publication Data
US 2020/0183451 A1 Jun. 11, 2020

Related U.S. Application Data

(60) Provisional application No. 62/774,878, filed on Dec. 4, 2018.

(51) Int. Cl.
*G06F 1/16* (2006.01)

(52) U.S. Cl.
CPC .......... *G06F 1/1616* (2013.01); *G06F 1/1624* (2013.01); *G06F 1/1684* (2013.01)

(58) Field of Classification Search
None
See application file for complete search history.

(56) References Cited

U.S. PATENT DOCUMENTS

| 5,534,891 A * | 7/1996 | Takano | G06F 1/1616 345/169 |
| 5,729,480 A * | 3/1998 | Katoh | G06F 1/1616 708/142 |
| 5,754,395 A * | 5/1998 | Hsu | G06F 1/1616 361/679.11 |
| 6,028,768 A * | 2/2000 | Cipolla | G06F 1/1616 361/679.12 |
| 6,175,492 B1 * | 1/2001 | Nobuchi | G06F 1/1616 361/679.08 |
| 6,762,931 B2 * | 7/2004 | Chen | G06F 1/1616 292/163 |

(Continued)

FOREIGN PATENT DOCUMENTS

| TW | 200928678 | 7/2009 |
| TW | I385505 | 2/2013 |

OTHER PUBLICATIONS

"Office Action of Taiwan Counterpart Application", dated Jun. 24, 2020, p. 1-p. 6.

*Primary Examiner* — Anthony Q Edwards
*Assistant Examiner* — Rashen E Morrison
(74) *Attorney, Agent, or Firm* — JCIPRNET

(57) ABSTRACT

A foldable electronic device includes a first body, a second body, a pivot module, a linkage mechanism, and an input module. The pivot module is connected to the first body and the second body. The second body is pivoted on the first body through the pivot module. The linkage mechanism is disposed in the first body and is connected to the pivot module. The input module is movably disposed on the first body through the linkage mechanism. The linkage mechanism is configured to be driven by the pivot module to cause the input module to move to be close to or away from the pivot module and cause the input module to be inclined or parallel to the first body.

13 Claims, 16 Drawing Sheets

(56) References Cited

U.S. PATENT DOCUMENTS

| | | | |
|---|---|---|---|
| 7,630,195 B2 * | 12/2009 | Lin | G06F 1/203 |
| | | | 361/679.26 |
| 8,929,061 B2 * | 1/2015 | Liao | G06F 1/1616 |
| | | | 361/679.08 |
| 9,213,371 B2 * | 12/2015 | Liu | G06F 1/1664 |
| 10,289,176 B1 * | 5/2019 | Chen | G06F 1/1656 |
| 2004/0145862 A1 * | 7/2004 | Hill | G06F 1/1667 |
| | | | 361/679.44 |
| 2017/0235337 A1 * | 8/2017 | Vic | E05D 11/00 |
| | | | 361/679.55 |
| 2020/0142456 A1 * | 5/2020 | Hsu | G06F 1/1681 |

* cited by examiner

FOLDABLE ELECTRONIC DEVICE

CROSS-REFERENCE TO RELATED APPLICATION

This application claims the priority benefit of U.S. provisional application Ser. No. 62/774,878, filed on Dec. 4, 2018. The entirety of the above-mentioned patent application is hereby incorporated by reference herein and made a part of this specification.

BACKGROUND OF THE INVENTION

1. Field of the Invention

The invention relates to a foldable electronic device, and in particular, to a foldable electronic device having a liftable and slidable input module.

2. Description of Related Art

With the development of technologies, a foldable electronic device is commonplace in daily life. Generally, users of the foldable electronic device expect that the foldable electronic device is compact and portable and can provide a better viewing visual effect and better use comfort on the basis of being compact and portable. Therefore, a person skilled in the art is to resolve problems that a current foldable electronic device has a relatively large volume, a periphery of a display screen is unsightly during use, and use comfort is insufficient.

SUMMARY OF THE INVENTION

The invention provides a foldable electronic device to resolve problems that a volume is relatively large, a periphery of a display screen is unsightly during use, and use comfort is insufficient.

A foldable electronic device of the invention includes a first body, a second body, a pivot module, a linkage mechanism, and an input module. The pivot module is connected to the first body and the second body. The second body is pivoted on the first body through the pivot module. The linkage mechanism is disposed in the first body and is connected to the pivot module. The input module is movably disposed on the first body through the linkage mechanism. The linkage mechanism is configured to be driven by the pivot module to cause the input module to move to be close to or away from the pivot module and cause the input module to be inclined or parallel to the first body.

In an embodiment of the invention, the linkage mechanism includes a tooth set, a guide set, and a linkage set that are disposed in the first body. The tooth set is connected to the pivot module and is configured to be driven by the pivot module. The guide set is connected to the tooth set and is configured to be driven by the tooth set. The linkage set is connected to the guide set. The input module is fixed to the linkage set. The linkage set is configured to be driven by the guide set to cause the input module to move relative to the first body.

In an embodiment of the invention, the guide set includes a first guide member, a first guide groove, a first guide post, a second guide member, a second guide groove, and a second guide post. The first guide member is located in the first body. The first guide groove is disposed on the first guide member. The first guide post is disposed on the tooth set. The first guide post passes through the first guide groove to cause the first guide member to be movably disposed on the first guide post, and is configured to be driven by the tooth set. The second guide member is located in the first body. The second guide groove is disposed on the second guide member. The second guide post is disposed on first guide member and passes through the second guide groove. The linkage set is movably disposed on the second guide post. The second guide post is configured to be driven by the second guide member to cause the linkage set to drive the input module to move relative to the first body.

In an embodiment of the invention, the second guide member is fixed to the first body. The second guide post passes through the second guide groove to move along the second guide groove, so that the first guide member is guided by the second guide groove and the second guide post to drive the linkage set, and the linkage set drives the input module to move relative to the first body.

In an embodiment of the invention, the second guide groove includes a first translation section, a translation lifting section, and a second translation section. The first translation section is disposed on the second guide groove and is configured to cause the linkage set to drive the input module to translate to be close to or away from the pivot module. The translation lifting section is disposed on the second guide groove, is connected to the first translation section, and is configured to cause the linkage set to drive the input module to move to be close to or away from the pivot module and cause the linkage set to drive the input module to be lifted or lowered relative to the first body. The second translation section is disposed on the second guide groove, is connected to the translation lifting section, and is configured to cause the linkage set to drive the input module to translate to be close to or away from the pivot module and cause the linkage set to drive the input module to be inclined to the first body.

In an embodiment of the invention, a height of the translation lifting section is less than a thickness of the first body.

In an embodiment of the invention, the second guide member is movably disposed on the second guide post through the second guide groove. The first guide post passes through the first guide groove to move along the first guide groove, and the second guide post passes through the second guide groove to move along the second guide groove, so that the first guide member is guided by the first guide groove and the first guide post and the second guide member is guided by the second guide groove and the second guide post to drive the linkage set, and the linkage set drives the input module to move relative to the first body.

In an embodiment of the invention, the first guide groove includes a first translation section and a lifting section. The second guide groove includes a translation lifting section and a second translation section. The first translation section is disposed on the first guide groove. The lifting section is disposed on the first guide groove, is connected to the first translation section, and is configured to cause the linkage set to drive the input module to be lifted or lowered relative to the first body. The translation lifting section is disposed on the second guide groove and is configured to cause the linkage set to drive the input module to move to be close to or away from the pivot module and cause the linkage set to drive the input module to be lifted or lowered relative to the first body. The second translation section is disposed on the second guide groove, is connected to the translation lifting section, and is configured to cause the linkage set to drive the input module to translate to be close to or away from the pivot module and cause the linkage set to drive the input module to be inclined to the first body.

In an embodiment of the invention, a sum of a height of the lifting section and a height of the translation lifting section is greater than a thickness of the first body.

In an embodiment of the invention, the linkage set includes a linkage member and a pivoting portion. The input module is fixed to the linkage member. The pivoting portion is disposed on the linkage member. The linkage member is pivoted on the guide set through the pivoting portion to be driven by the guide set.

In an embodiment of the invention, the linkage set includes a linkage member and a sliding portion. The input module is fixed to the linkage member. The sliding portion is disposed on the linkage member, and the linkage member is slidably disposed on the guide set through the sliding portion to be driven by the guide set.

In an embodiment of the invention, the tooth set includes an input terminal, a transmission terminal, and an output terminal. The input terminal is disposed on the pivot module to be driven by the pivot module. The transmission terminal is disposed in the first body and is engaged with the input terminal to be driven by the input terminal. The output terminal is slidably disposed in the first body and is engaged with the transmission terminal to be driven by the transmission terminal. The linkage set is connected to the output terminal to be driven by the output terminal.

In an embodiment of the invention, a ratio of a tooth quantity of the input terminal to a tooth quantity of the output terminal is greater than or equal to 2 and less than or equal to 20.

In an embodiment of the invention, the tooth set includes a fixing member fixed to the first body. The transmission terminal includes a first tooth portion, a second tooth portion, a third tooth portion, a fourth tooth portion, a fifth tooth portion, a sixth tooth portion, and a seventh tooth portion. The first tooth portion is pivoted on the fixing member and is engaged the input terminal. The second tooth portion is fixed to the first tooth portion. The third tooth portion is pivoted on the fixing member and is engaged with the second tooth portion. The fourth tooth portion is pivoted on the fixing member and is engaged with the third tooth portion. The fifth tooth portion is slidably disposed on the fixing member and is engaged with the fourth tooth portion. The sixth tooth portion is pivoted on the fixing member and is engaged with the fifth tooth portion. The seventh tooth portion is fixed to the sixth tooth portion. The output terminal is slidably disposed on the fixing member. The output terminal is engaged with the seventh tooth portion to be driven by the seventh tooth portion.

In an embodiment of the invention, the tooth set includes a fixing member fixed to the first body. The transmission terminal includes a first tooth portion, a second tooth portion, a third tooth portion, a fourth tooth portion, and a fifth tooth portion. The first tooth portion is pivoted on the fixing member and is engaged the input terminal. The second tooth portion is fixed to the first tooth portion. The third tooth portion is pivoted on the fixing member and is engaged with the second tooth portion. The fourth tooth portion is pivoted on the fixing member and is engaged with the third tooth portion. The fifth tooth portion is fixed to the fourth tooth portion. The output terminal is slidably disposed in the first body. The output terminal is engaged with the fifth tooth portion to be driven by the fifth tooth portion.

Based on the above, the invention provides a compact and portable foldable electronic device in which a periphery of a display screen is sightly during use and use comfort is sufficient.

To make the features and advantages of the invention clear and easy to understand, the following gives a detailed description of embodiments with reference to accompanying drawings.

DESCRIPTION OF THE EMBODIMENTS

Figure 1:
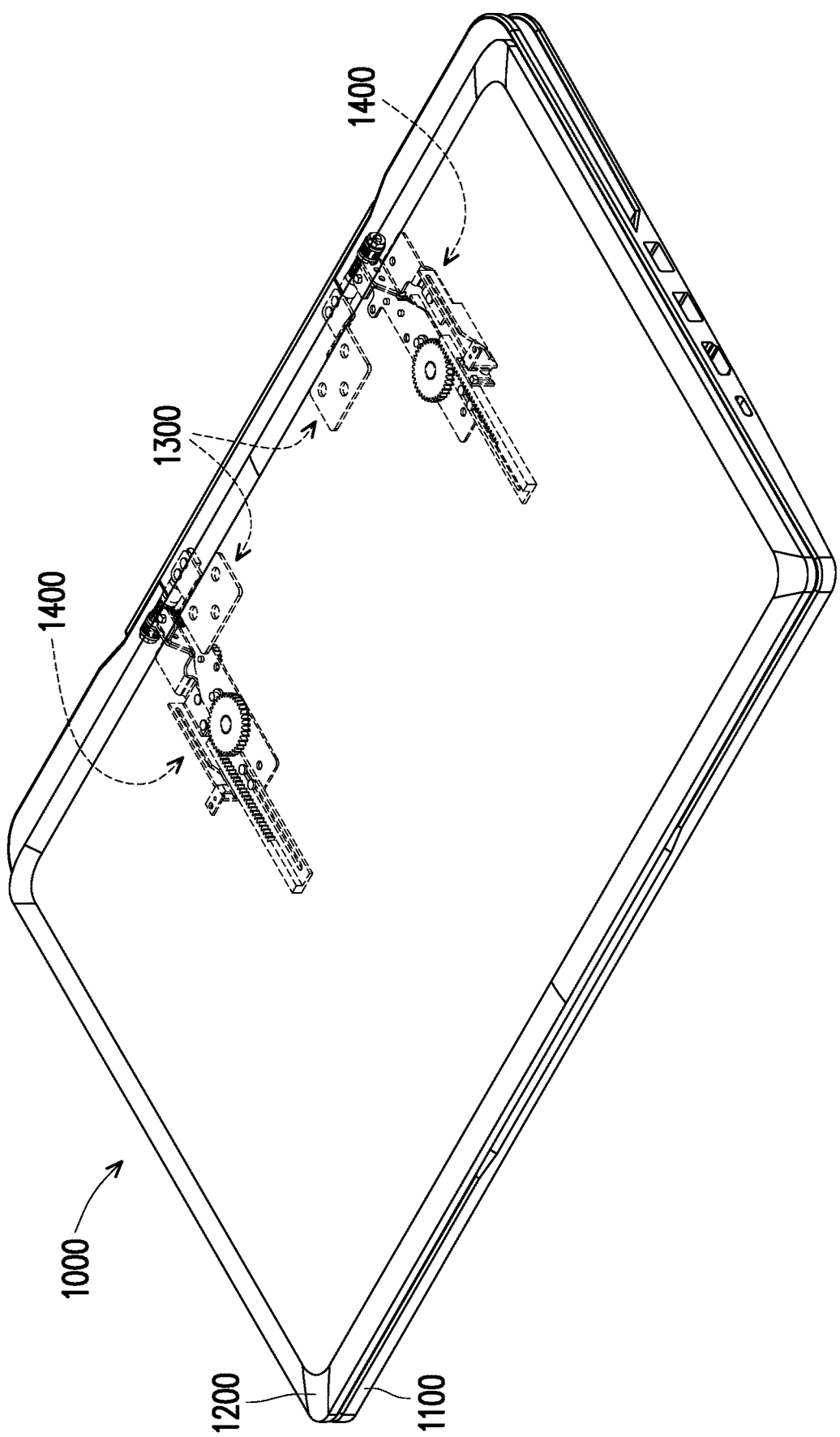
FIG. 1 is a schematic three-dimensional diagram of a foldable electronic device according to an embodiment of the invention.
Figure 2:
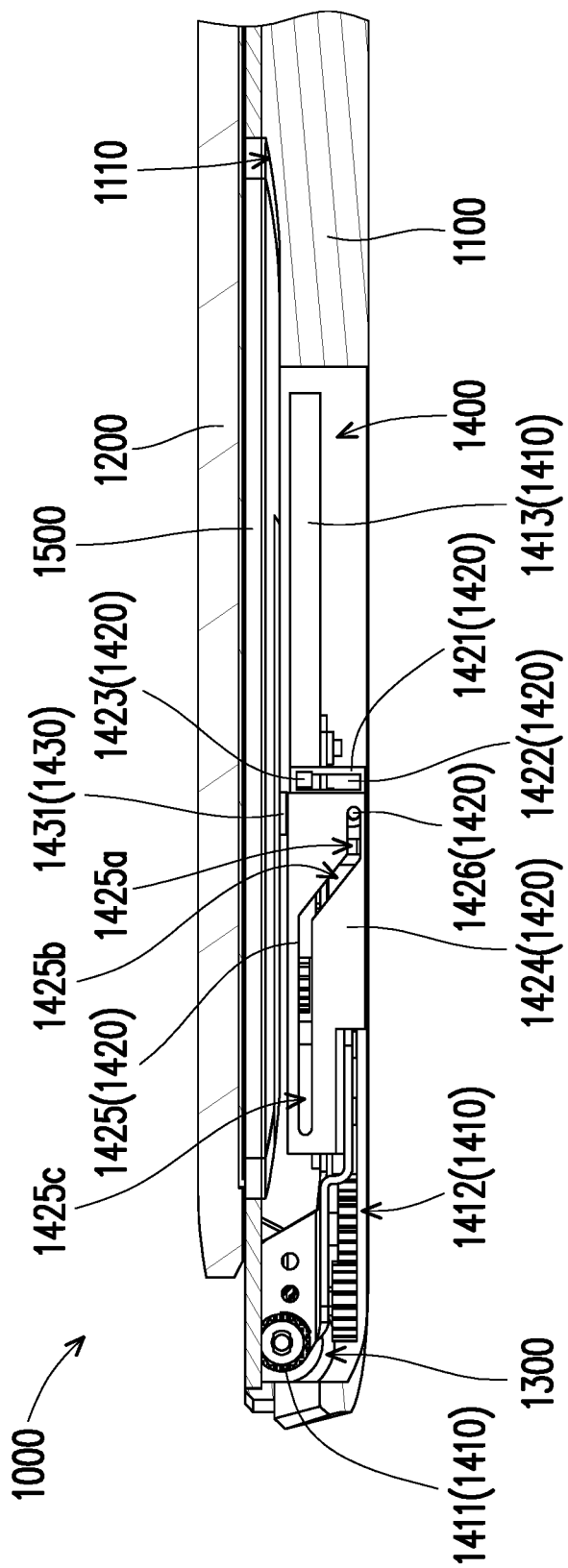
FIG. 2 is a schematic partial cross-sectional view of the foldable electronic device in FIG. 1.
Figure 3:
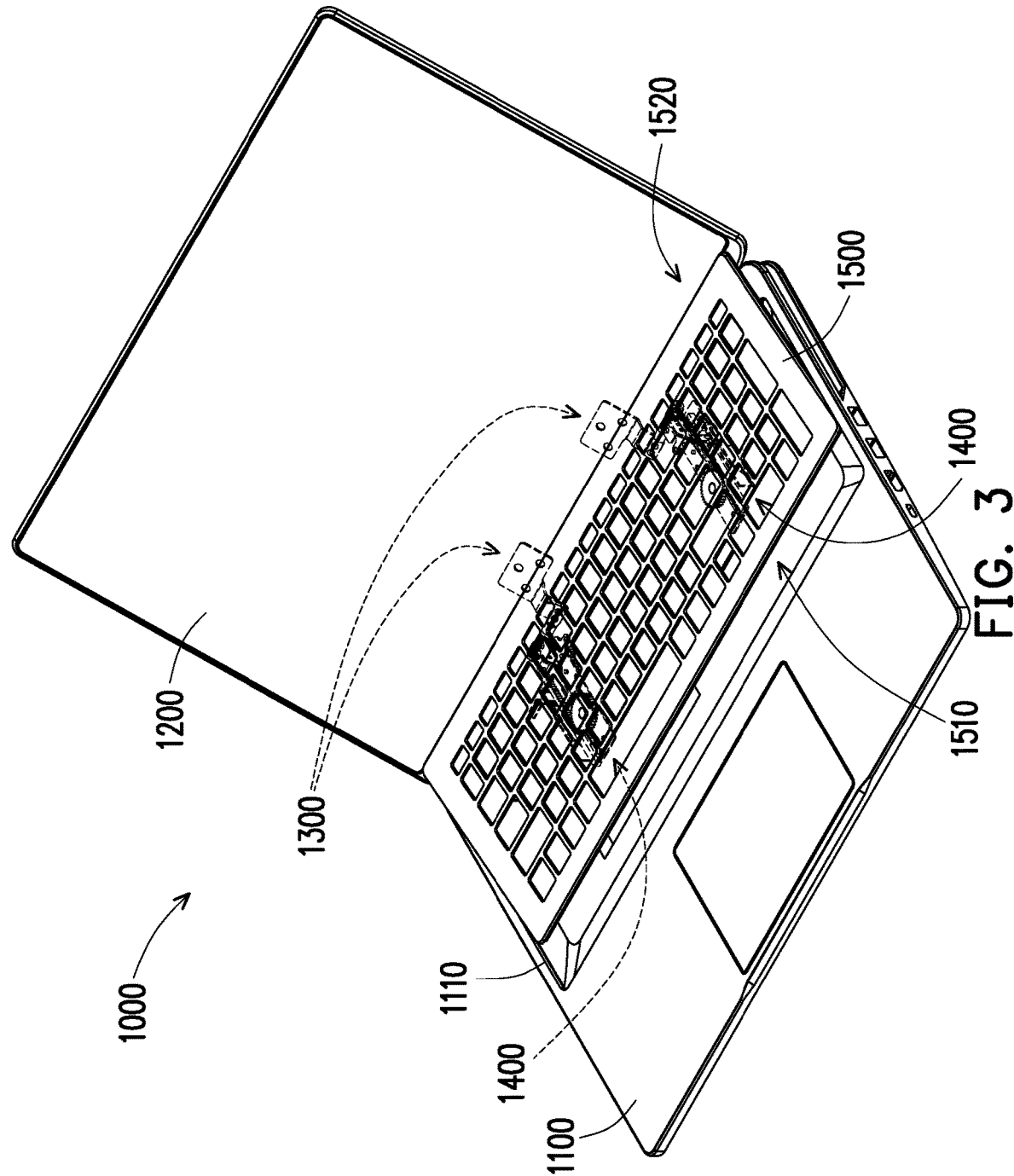
FIG. 3 is a schematic three-dimensional diagram in which a second body of the foldable electronic device in FIG. 1 is fully expanded relative to a first body.
Figure 4:
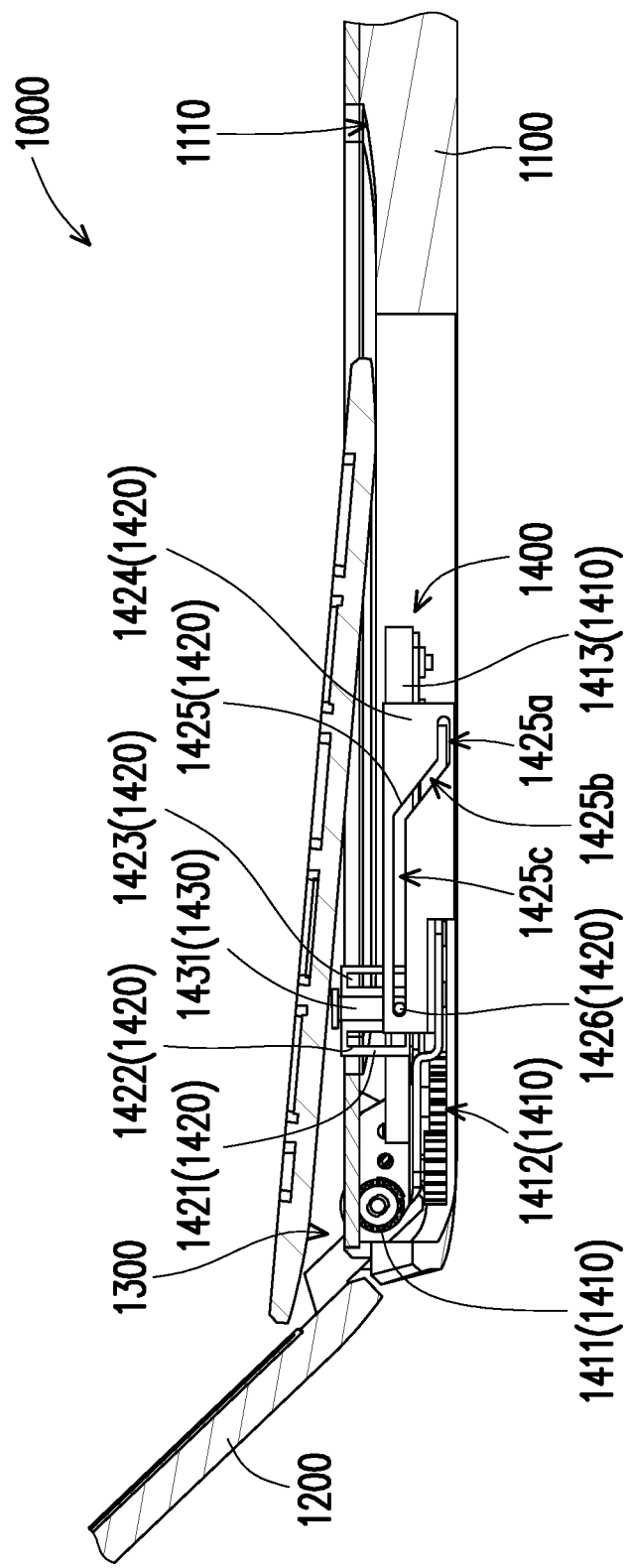
FIG. 4 is a schematic partial cross-sectional view of the foldable electronic device in FIG. 3.

FIG. 1 is a schematic three-dimensional diagram of a foldable electronic device according to an embodiment of the invention. FIG. 2 is a schematic partial cross-sectional view of the foldable electronic device in FIG. 1. FIG. 3 is a schematic three-dimensional diagram in which a second body of the foldable electronic device in FIG. 1 is fully expanded relative to a first body. FIG. 4 is a schematic partial cross-sectional view of the foldable electronic device in FIG. 3. Referring to FIG. 1, FIG. 2, FIG. 3, and FIG. 4, a foldable electronic device 1000 includes a first body 1100, a second body 1200, a pivot module 1300, a linkage mechanism 1400, and an input module 1500. The pivot module 1300 is connected between the first body 1100 and the second body 1200, so that the second body 1200 is pivoted on the first body 1100 through the pivot module 1300, the second body 1200 can pivot relative to the first body 1100, and the second body 1200 can drive the pivot module 1300. The linkage mechanism 1400 is disposed in the first body 1100. The linkage mechanism 1400 is connected to the pivot module 1300 to be driven by the pivot module 1300. The input module 1500 is connected to the linkage mechanism 1400 and is movably disposed on the first body 1100 through the linkage mechanism 1400. The linkage mechanism 1400 is configured to be driven by the pivot module 1300 to cause the input module 1500 to move away from the pivot module 1300 as shown in FIG. 1 and FIG. 2 or move to be close to the pivot module 1300 as shown in FIG. 3 and FIG. 4, and cause the input module 1500 to be parallel to the first body 1100 as shown in FIG. 1 and FIG. 2 or inclined to the first body 1100 as shown in FIG. 3 and FIG. 4.

Therefore, when the input module 1500 moves away from the pivot module 1300 and is parallel to the first body 1100, the second body 1200 may be closed relative to the first body 1100 to facilitate accommodation and carrying. When a user uses the foldable electronic device 1000 in the present embodiment, a junction between the second body 1200 and the first body 1100 may be blocked by the input module 1500 after the input module 1500 moves to be close to the pivot module 1300, thereby increasing the aesthetics. In addition, the input module 1500 may be lifted by the linkage mechanism 1400 to provide a more comfortable operation angle for the user.

The first body 1100 further includes an accommodating space 1110 configured to accommodate the input module 1500. When the second body 1200 is closed relative to the first body 1100 as shown in FIG. 1 and FIG. 2, the input module 1500 is accommodated in the accommodation space 1110, and a first side 1510 of the input module 1500 and a second side 1520 opposite to the first side 1510 are located in the accommodation space 1110. When the second body 1200 is fully expanded relative to the first body 1100 as shown in FIG. 3 and FIG. 4, the first side 1510 of the input module 1500 is still located in the accommodation space 1110, but the second side 1520 of the input module 1500 moves out of the accommodation space 1110 and faces a display surface of the second body 1200.

Figure 5:
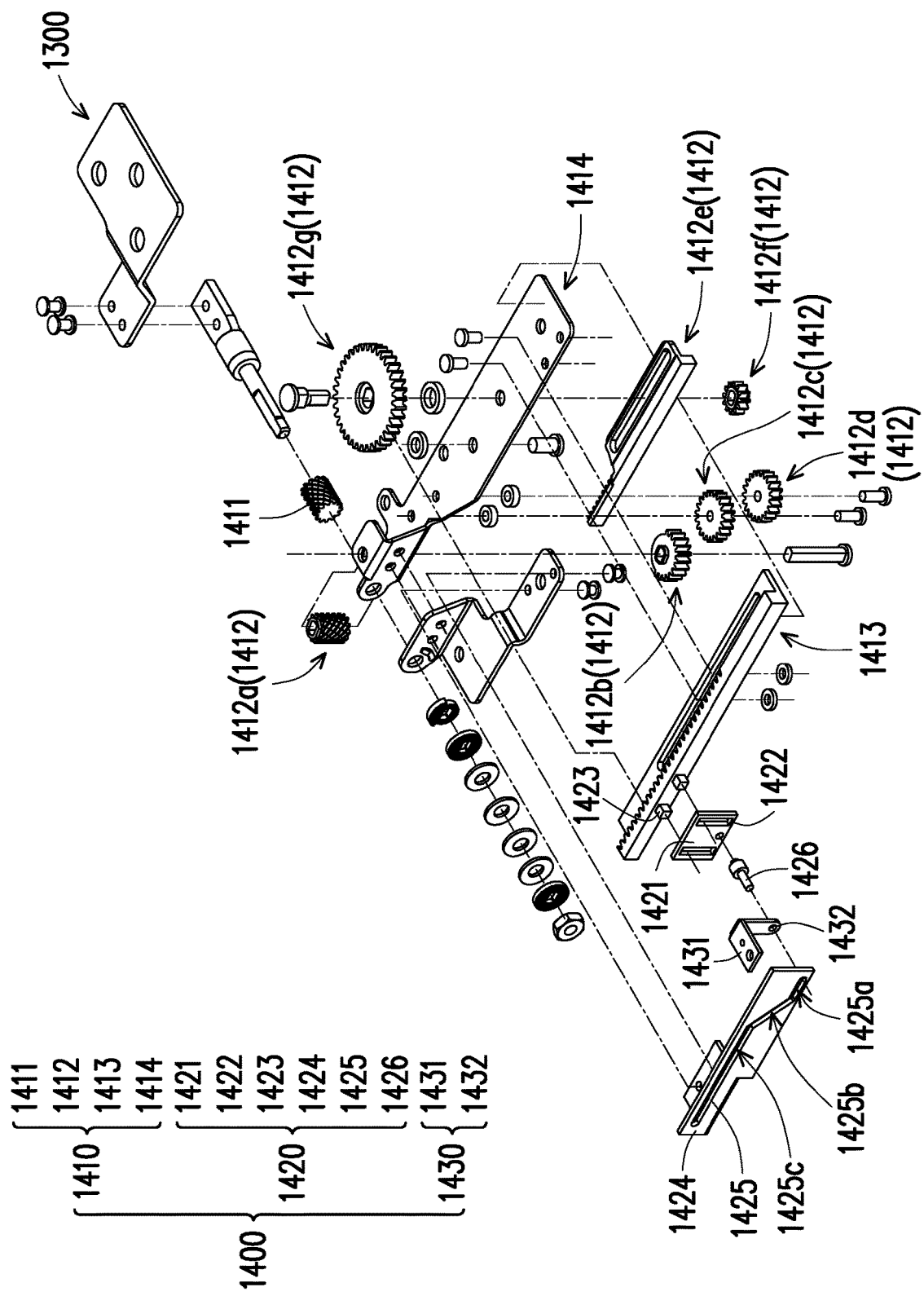
FIG. 5 is an exploded schematic diagram of a pivot module and a linkage mechanism of the foldable electronic device in FIG. 1.
Figure 6:
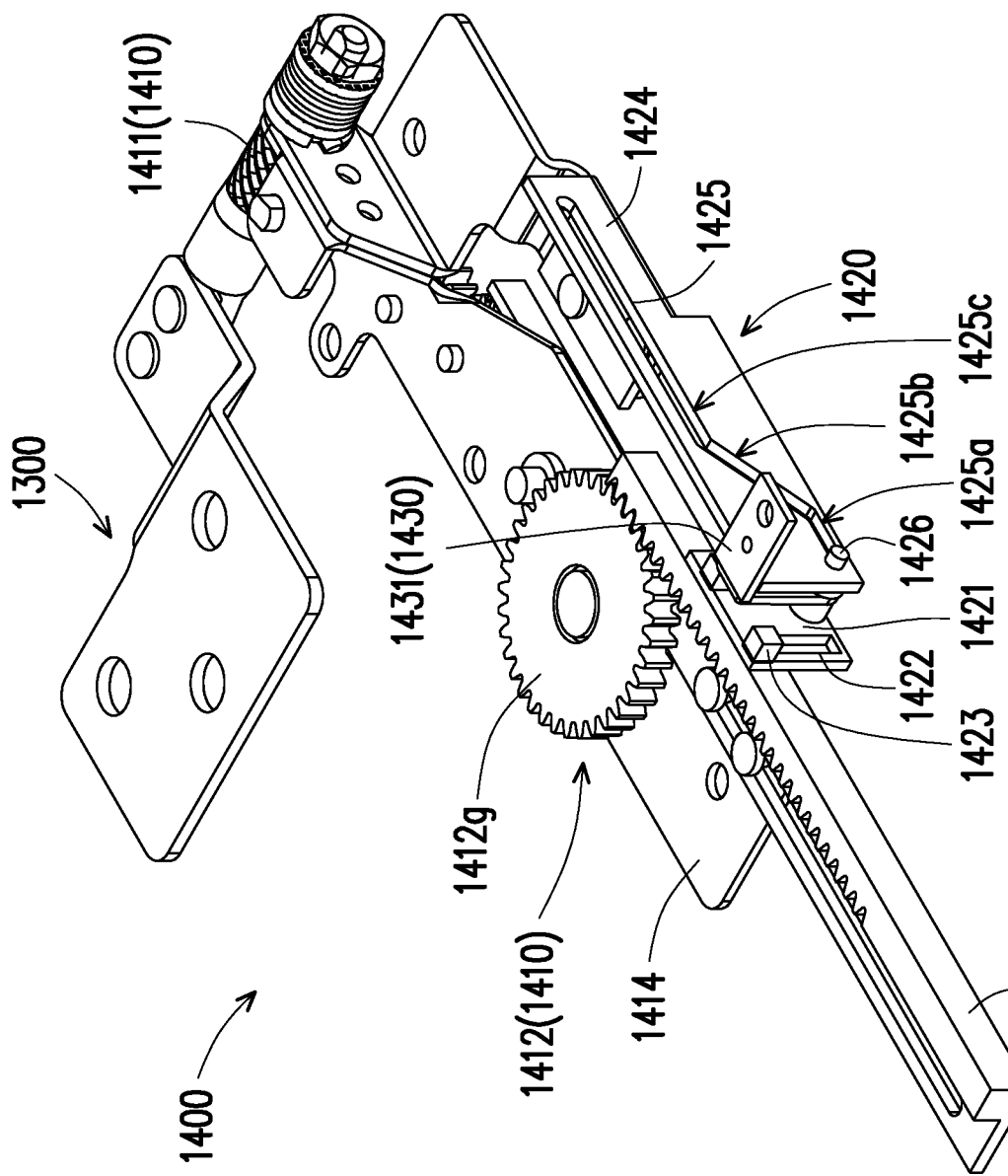
FIG. 6 is a schematic three-dimensional diagram of a pivot module and a linkage mechanism of the foldable electronic device in FIG. 1.

FIG. 5 is an exploded schematic diagram of a pivot module and a linkage mechanism of the foldable electronic device in FIG. 1. FIG. 6 is a schematic three-dimensional diagram of a pivot module and a linkage mechanism of the foldable electronic device in FIG. 1. Referring to FIG. 1, FIG. 2, FIG. 5, and FIG. 6, the linkage mechanism 1400 includes a tooth set 1410, a guide set 1420, and a linkage set 1430 that are all disposed in the first body 1100. The tooth set 1410 is connected to the pivot module 1300 and is configured to be driven by the pivot module 1300. The guide set 1420 is connected to the tooth set 1410 and is configured to be driven by the tooth set 1410. The linkage set 1430 is connected to the guide set 1420. The input module 1500 is fixed to the linkage set 1430. The linkage set 1430 is configured to be driven by the guide set 1420 to cause the input module 1500 to move relative to the first body 1100.

In particular, the tooth set 1410 includes an input terminal 1411, a transmission terminal 1412, and an output terminal 1413. The input terminal 1411 is disposed on the pivot module 1300 to be driven by the pivot module 1300. The transmission terminal 1412 is disposed in the first body 1100 and is engaged with the input terminal 1411 to be driven by the input terminal 1411. The output terminal 1413 is slidably disposed in the first body 1100 and is engaged with the transmission terminal 1412 to be driven by the transmission terminal 1412. The linkage set 1430 is connected to the output terminal 1413 to be driven by the output terminal 1413.

In the present embodiment, a ratio of a tooth quantity of the input terminal 1411 to a tooth quantity of the output terminal 1413 is greater than or equal to 2 and less than or equal to 20. In other words, after the second body 1200 drives the pivot module 1300 to rotate, a displacement amount generated by the output terminal 1413 can be increased after the pivot module 1300 passes through a path of the input terminal 1411, the transmission terminal 1412, and the output terminal 1413. Therefore, small rotation of the pivot module 1300 can cause large displacement of the input module 1500, so that a limited internal space of the first body 1100 can be effectively utilized. In addition to improving space utilization, miniaturization of the foldable electronic device 1000 can be implemented.

In the present embodiment, the transmission terminal 1412 is configured to transmit the rotation of the pivot module 1300 to the output terminal 1413, and a structure and a configuration of the transmission terminal 1412 are not limited. The following gives a simple example.

The tooth set 1410 in the present embodiment includes a fixing member 1414 fixed to the first body 1100. The transmission terminal 1412 includes a first tooth portion 1412a, a second tooth portion 1412b, a third tooth portion 1412c, a fourth tooth portion 1412d, a fifth tooth portion 1412e, a sixth tooth portion 1412f, and a seventh tooth portion 1412g. The first tooth portion 1412a is pivoted on the fixing member 1414, and is a helical gear engaged with the input terminal 1411. The second tooth portion 1412b is fixed to the first tooth portion 1412a, and is disposed on a same transmission shaft as the first tooth portion 1412a. The third tooth portion 1412c is pivoted on the fixing member 1414, and is a spur gear engaged with the second tooth portion 1412b. The second tooth portion 1412b may be provided with teeth only within an effective stroke to effectively utilize an internal space of the first body 1100. The fourth tooth portion 1412d is pivoted on the fixing member 1414, and is a spur gear engaged with the third tooth portion 1412c. The fifth tooth portion 1412e is slidably disposed on the fixing member 1414, and is a rack and is engaged with the fourth tooth portion 1412d. The sixth tooth portion 1412f is pivoted on the fixing member 1414, and is a spur gear and is engaged with the fifth tooth portion 1412e. The seventh tooth portion 1412g is fixed to the sixth tooth portion 1412f, and is a spur gear disposed on a same transmission shaft as the sixth tooth portion 1412f. The output terminal 1413 is slidably disposed on the fixing member 1414 and is a rack engaged with the seventh tooth portion 1412g. The output terminal 1413 is engaged with the seventh tooth portion 1412g to be driven by the seventh tooth portion 1412g.

Referring to FIG. 1, FIG. 2, FIG. 5, and FIG. 6, the guide set 1420 includes a first guide member 1421, a first guide groove 1422, a first guide post 1423, a second guide member 1424, a second guide groove 1425, and a second guide post 1426. The first guide member 1421 is located in the first body 1100. The first guide groove 1422 is disposed on the first guide member 1421. The first guide post 1423 is disposed on the tooth set 1410. The first guide post 1423 passes through the first guide groove 1422 to cause the first guide member 1421 to be movably disposed on the first guide post 1423, and is configured to be driven by the tooth set 1410. The second guide member 1424 is located in the first body 1100. The second guide groove 1425 is disposed on the second guide member 1424. The second guide post 1426 is disposed on the first guide member 1421 and passes through the second guide groove 1425. The linkage set 1430 is movably disposed on the second guide post 1426. The second guide post 1426 is configured to be driven by the second guide member 1424 to cause the linkage set 1430 to drive the input module 1500 to move relative to the first body 1100.

The linkage set 1430 includes a linkage member 1431 and a pivoting portion 1432 disposed on the linkage member 1431. The linkage member 1431 is pivoted on the guide set 1420 through the pivoting portion 1432 to be driven by the guide set 1420. The input module 1500 is fixed to the linkage member 1431. In other words, the linkage member 1431 is configured to be driven by the guide set 1420 to cause the input module 1500 to move.

In the present embodiment, the second guide member 1424 is fixed to the first body 1100. The second guide post 1426 passes through the second guide groove 1425 to move along the second guide groove 1425, so that the first guide member 1421 is guided by the second guide groove 1425 an the second guide post 1426 to drive the linkage set 1430, and the linkage set 1430 drives the input module 1500 to move relative to the first body 1100.

Figure 7:
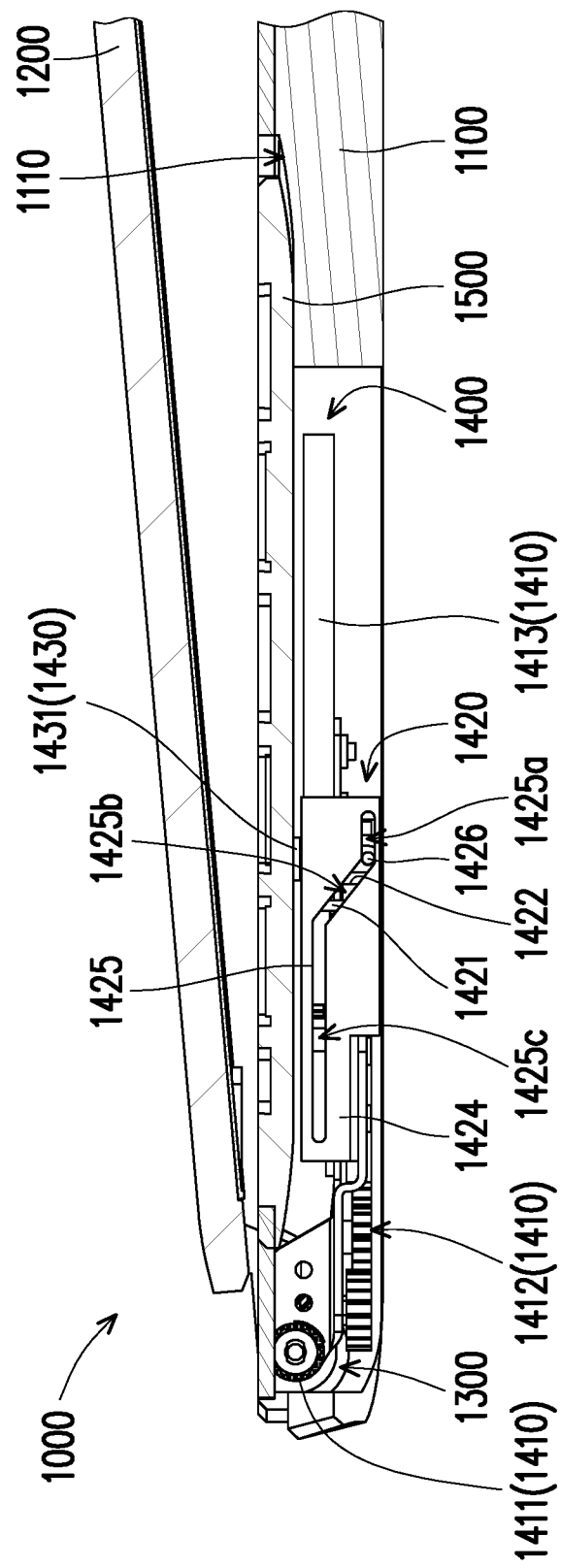
FIG. 7 and FIG. 8 illustrate an intermediate transition procedure in which a second body is from a closed state to a fully expanded state relative to a first body according to an embodiment of the invention.
Figure 8:
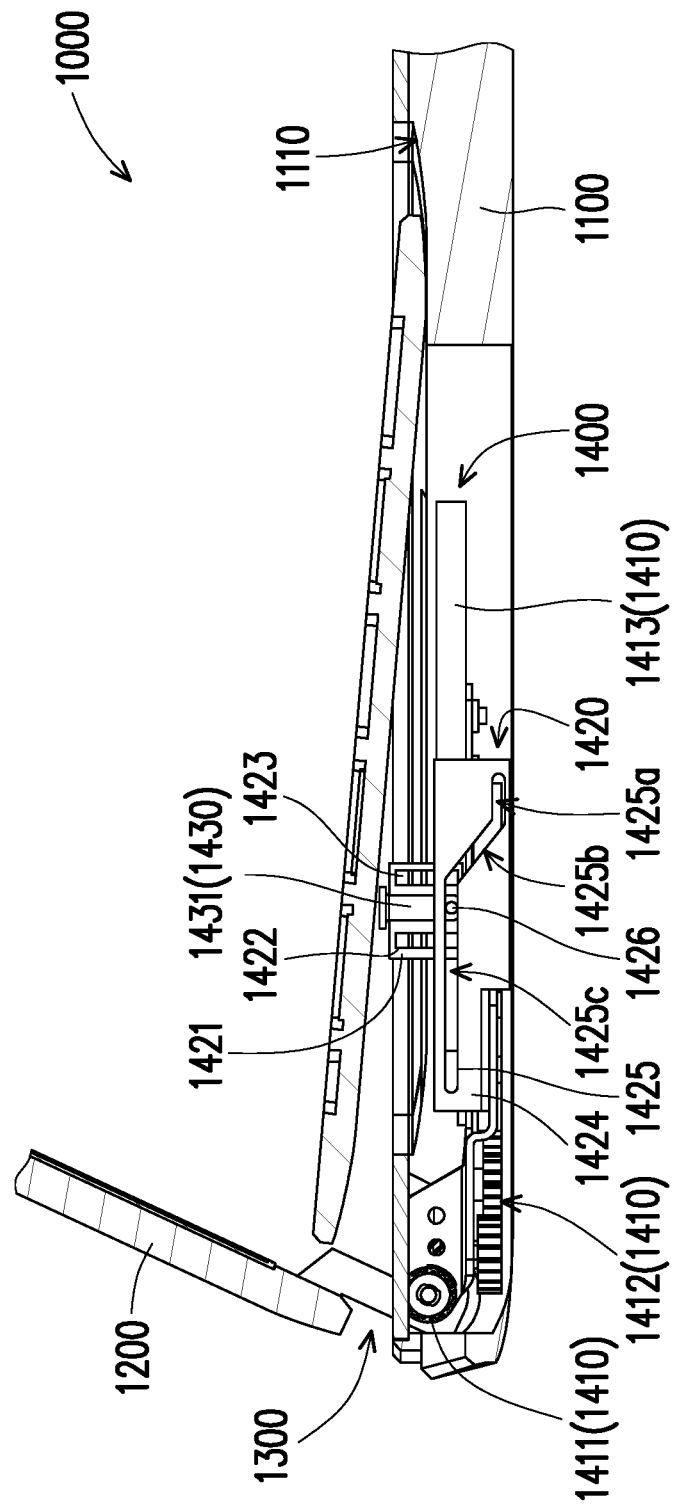

FIG. 7 and FIG. 8 illustrate an intermediate transition procedure in which a second body is from a closed state to a fully expanded state relative to a first body according to an embodiment of the invention. Referring to FIG. 2, FIG. 5, FIG. 6, and FIG. 7, the second guide groove 1425 includes a first translation section 1425*a*, a translation lifting section 1425*b*, and a second translation section 1425*c*. The first translation section 1425*a* is disposed on the second guide groove 1425 and is configured to cause the linkage set 1430 to drive the input module 1500 to translate to be close to or away from the pivot module 1300. The translation lifting section 1425*b* is disposed on the second guide groove 1425, is connected to the first translation section 1425*a*, and is configured to cause the linkage set 1430 to drive the input module 1500 to move to be close to or away from the pivot module 1300 and cause the linkage set 1430 to drive the input module 1500 to be lifted or lowered relative to the first body 1100. The second translation section 1425*c* is disposed on the second guide groove 1425, is connected to the translation lifting section 1425*b*, and is configured to cause the linkage set 1430 to drive the input module 1500 to translate to be close to or away from the pivot module 1300 and cause the linkage set 1430 to drive the input module 1500 to be inclined to the first body 1100. In the present embodiment, a height of the translation lifting section 1425*b* is less than a thickness of the first body 1100.

When the second body 1200 is expanded at a small angle relative to the first body 1100 as shown in FIG. 7, the first guide post 1423 moves from the right side of the first translation section 1425*a* to the left side of the first translation section 1425*a*, and the input module 1500 is translated along a direction of the pivot module 1300. Accordingly, the second body 1200 is expanded at a small angle relative to the first body 1100 in advance, so that the input module 1500 can be prevented from colliding with the second body 1200 when being lifted.

When the second body 1200 is expanded at a relatively large angle relative to the first body 1100 as shown in FIG. 8, the input module 1500 is relatively lifted and moves to be close to the pivot module 1300. When the second body 1200 is further fully expanded relative to the first body 1100 as shown in FIG. 4, the foldable electronic device 1000 can be operated by the user. The lifted input device can also increase a heat dissipation effect of the first body 1100.

Figure 9:
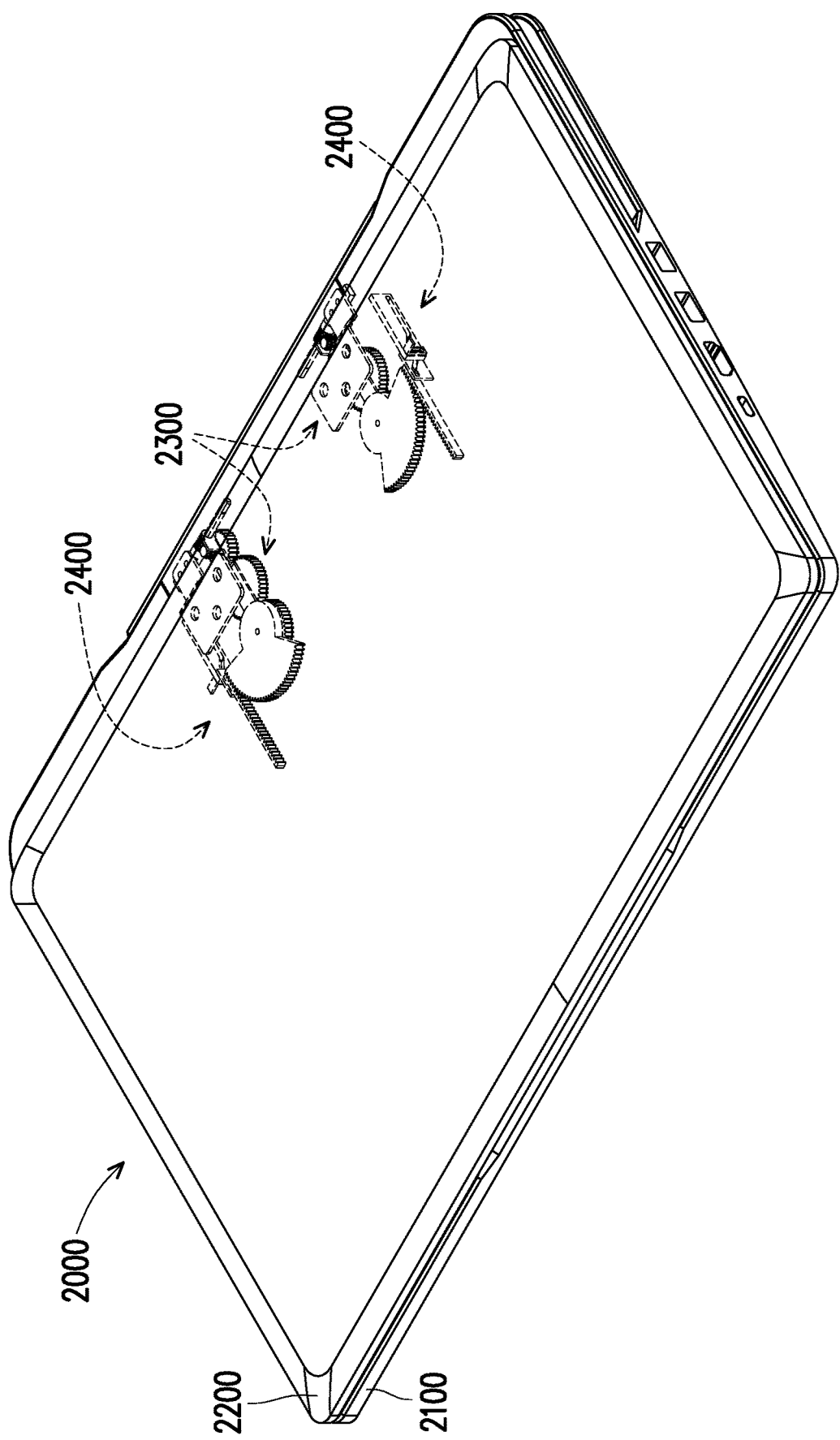
FIG. 9 is a schematic three-dimensional diagram of a foldable electronic device according to another embodiment of the invention.
Figure 10:
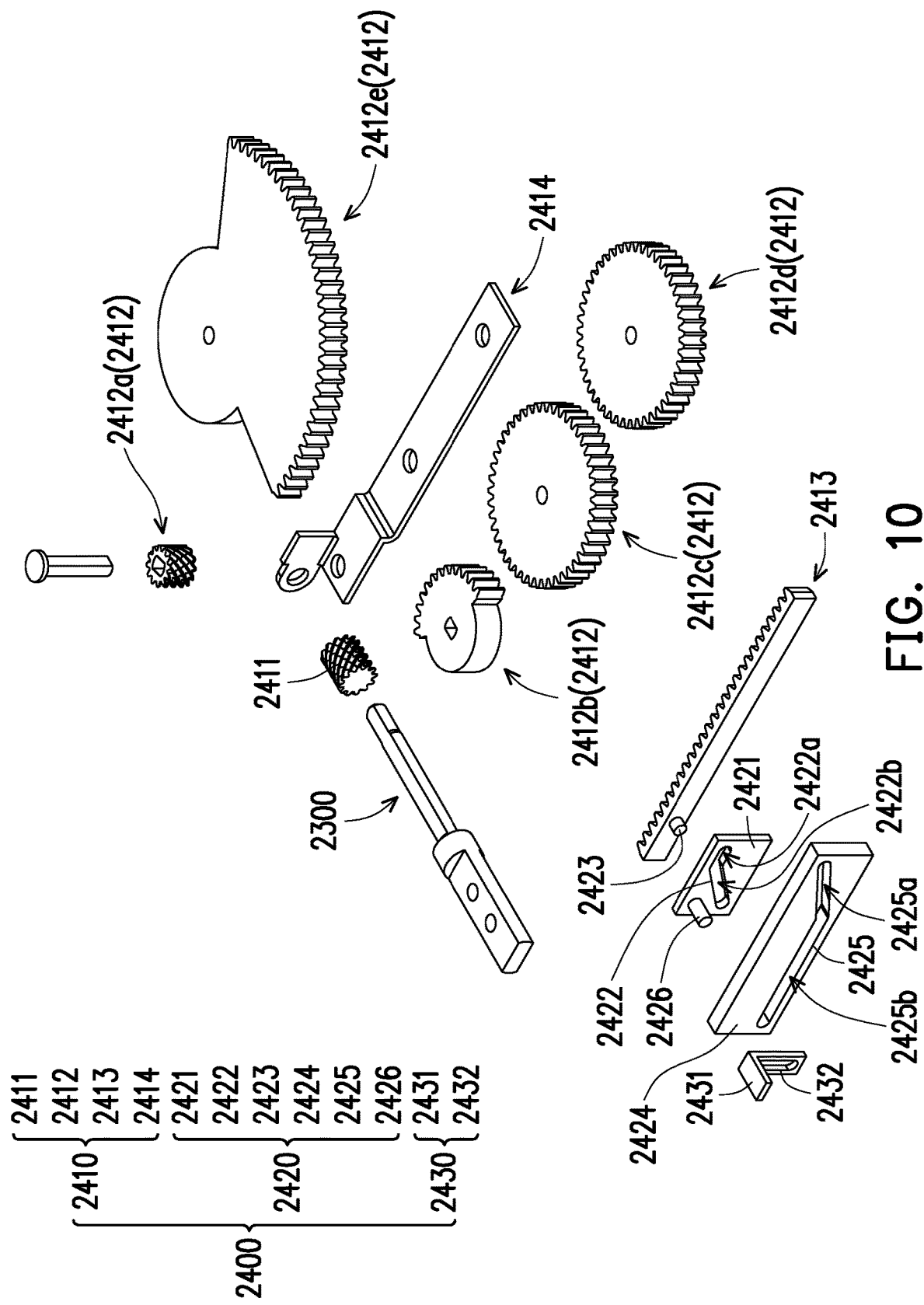
FIG. 10 is an exploded schematic diagram of a pivot module and a linkage mechanism of the foldable electronic device in FIG. 9.
Figure 11:
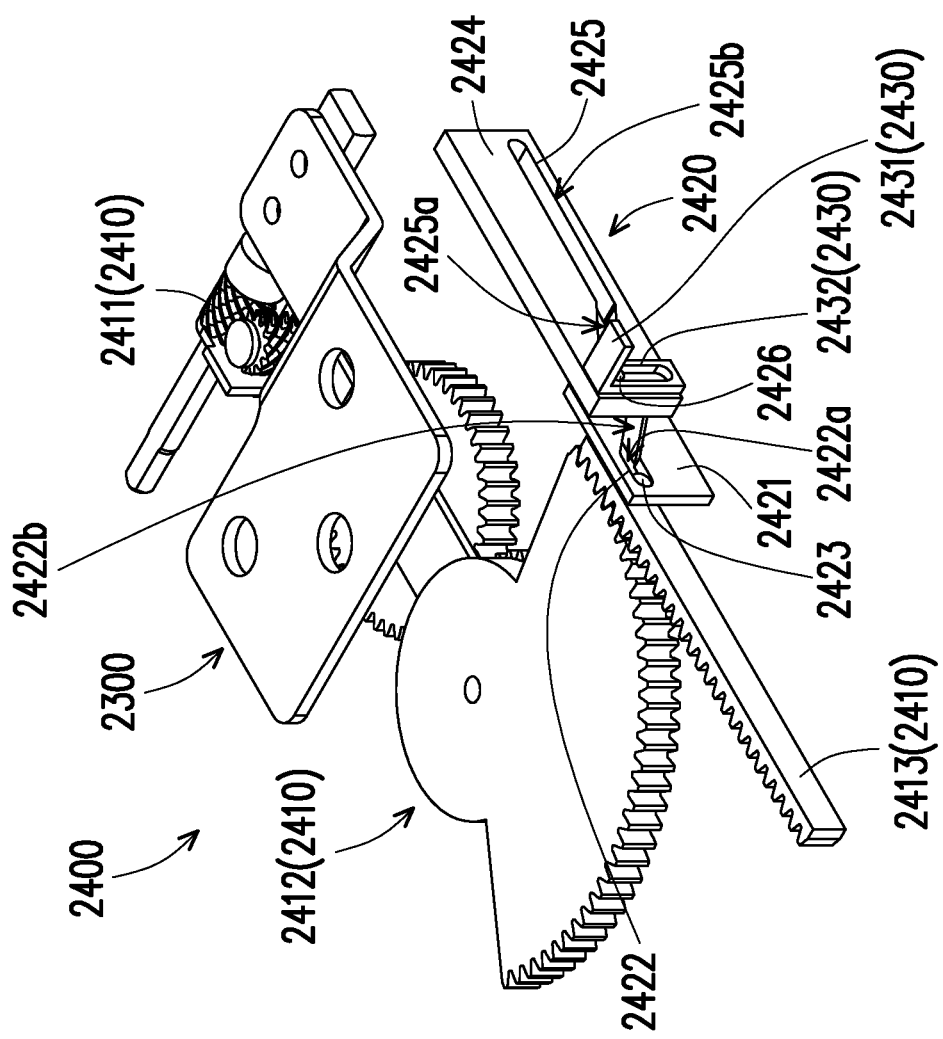
FIG. 11 is a schematic three-dimensional diagram of a pivot module and a linkage mechanism of the foldable electronic device in FIG. 9.
Figure 12:
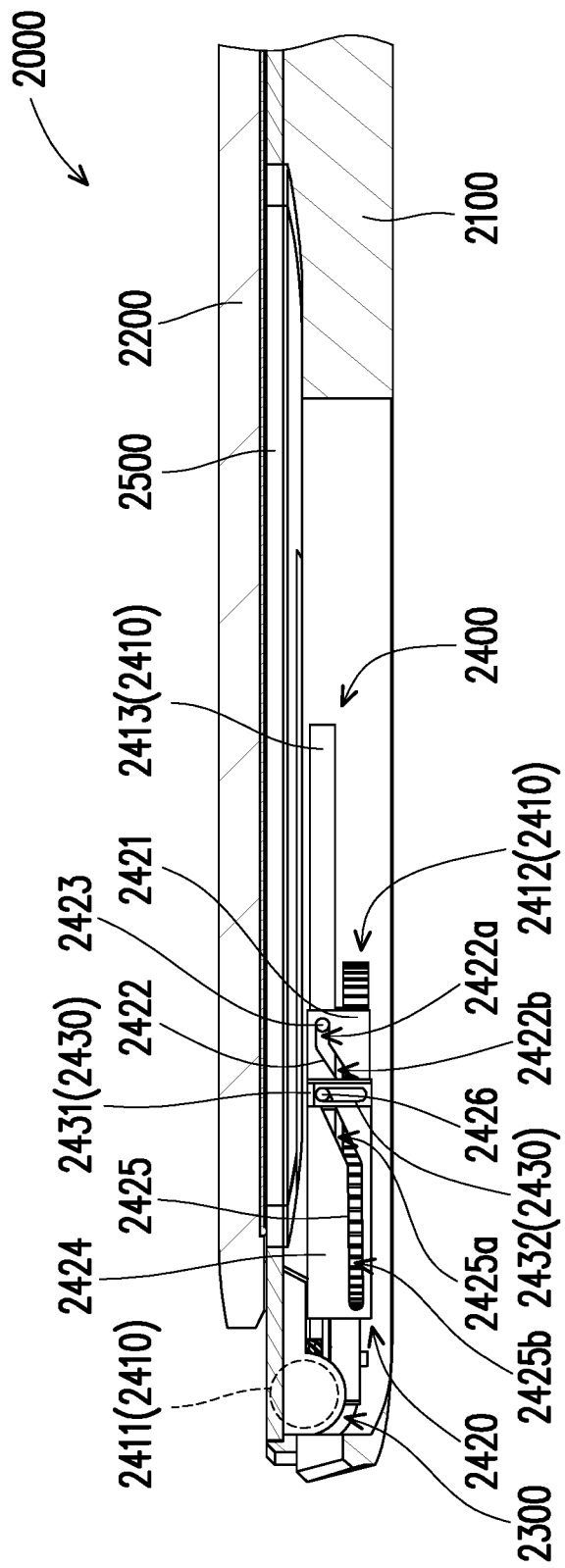
FIG. 12 is a schematic partial cross-sectional view of the foldable electronic device in FIG. 9.

FIG. 9 is a schematic three-dimensional diagram of a foldable electronic device according to another embodiment of the invention. FIG. 10 is an exploded schematic diagram of a pivot module and a linkage mechanism of the foldable electronic device in FIG. 9. FIG. 11 is a schematic three-dimensional diagram of a pivot module and a linkage mechanism of the foldable electronic device in FIG. 9. FIG. 12 is a schematic partial cross-sectional view of the foldable electronic device in FIG. 9. Referring to FIG. 9, FIG. 10, FIG. 11, and FIG. 12, in a foldable electronic device 2000 in the present embodiment, a second body 2200 is pivoted on a first body 2100 through a pivot module 2300. A linkage mechanism 2400 is disposed in the first body 2100. A second guide member 2424 is movably disposed on a second guide post 2426 through a second guide groove 2425. A first guide post 2423 passes through a first guide groove 2422 to move along the first guide groove 2422, and the second guide post 2426 passes through the second guide groove 2425 to move along the second guide groove 2425, so that a first guide member 2421 is guided by the first guide groove 2422 and the first guide post 2423 and a second guide member 2424 is guided by the second guide groove 2425 and the second guide post 2426 to drive a linkage set 2430, and the linkage set 2430 drives an input module 2500 to move relative to the first body 2100.

A tooth set 2410 includes a fixing member 2414 fixed to the first body 2100. A transmission terminal 2412 includes a first tooth portion 2412*a*, a second tooth portion 2412*b*, a third tooth portion 2412*c*, a fourth tooth portion 2412*d*, and a fifth tooth portion 2412*e*. The first tooth portion 2412*a* is pivoted on the fixing member 2414, and is a helical gear engaged with an input terminal 2411. The second tooth portion 2412*b* is fixed to the first tooth portion 2412*a*, and is located on a same transmission shaft as the first tooth portion 2412*a*. The second tooth portion 2412*b* may be provided with teeth only within an effective stroke to effectively utilize an internal space of the first body 2100. The third tooth portion 2412*c* is pivoted on the fixing member 2414, and is a spur gear engaged with the second tooth portion 2412*b*. The fourth tooth portion 2412*d* is pivoted on the fixing member 2414, and is a spur gear engaged with the third tooth portion 2412*c*. The fifth tooth portion 2412*e* is fixed to the fourth tooth portion 2412*d*, and is located on a same transmission shaft as the fourth tooth portion 2412*d*. The fifth tooth portion 2412*e* may be provided with teeth only within an effective stroke to effectively utilize an internal space of the first body 2100. An output terminal 2413 is slidably disposed on the first body 2100 and is a rack engaged with the fifth tooth portion 2412*e*. The output terminal 2413 is engaged with the fifth tooth portion 2412*e* to be driven by the fifth tooth portion 2412*e*.

FIG. 13 to FIG. 16 illustrate an operation procedure of driving a linkage mechanism by a pivot module according to another embodiment of the invention. Referring to FIG. 10 and FIG. 12, the first guide groove 2422 includes a first translation section 2422*a* and a lifting section 2422*b*. The second guide groove 2425 includes a translation lifting section 2425*a* and a second translation section 2425*b*. The linkage set 2430 includes a linkage member 2431 and a sliding portion 2432. The input module 2500 is fixed to the linkage member 2431. The sliding portion 2432 is disposed on the linkage member 2431, and the linkage member 2431 is slidably disposed on a guide set 2420 through the sliding portion 2432 to be driven by the guide set 2420.

Figure 13:
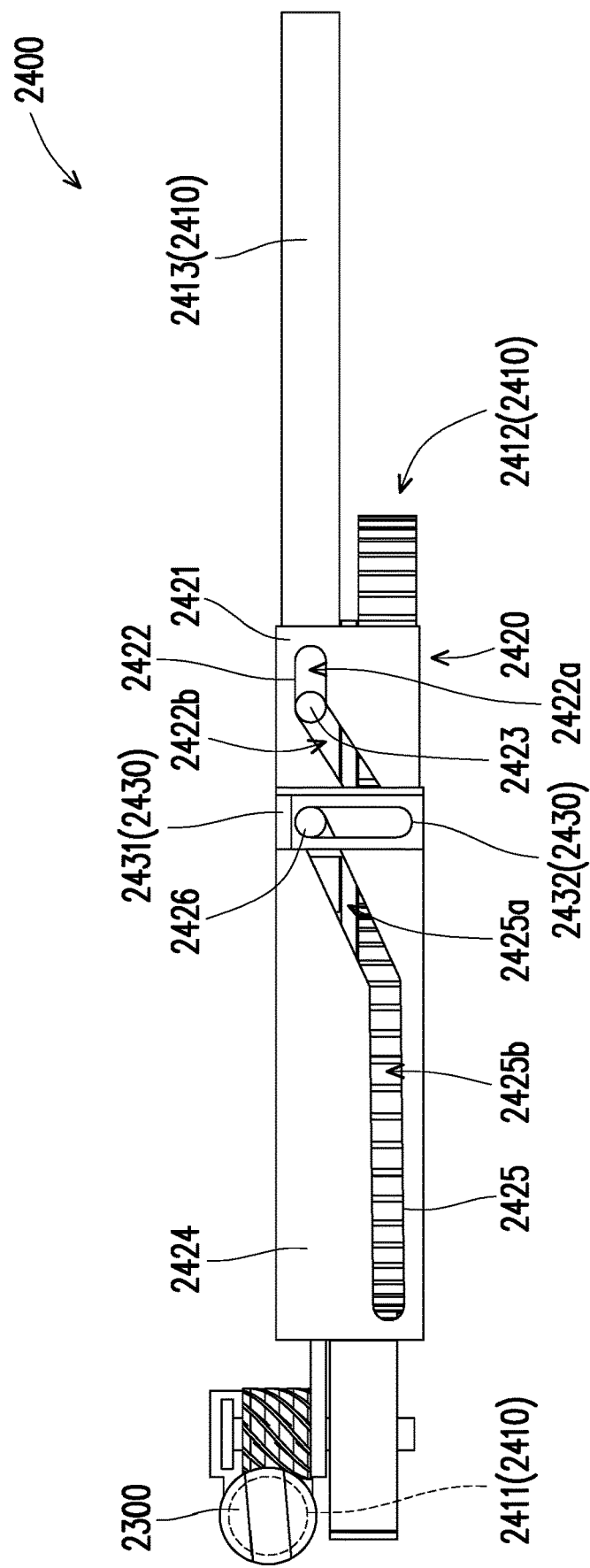
FIG. 13 to FIG. 16 illustrate an operation procedure of driving a linkage mechanism by a pivot module according to another embodiment of the invention.
Figure 14:
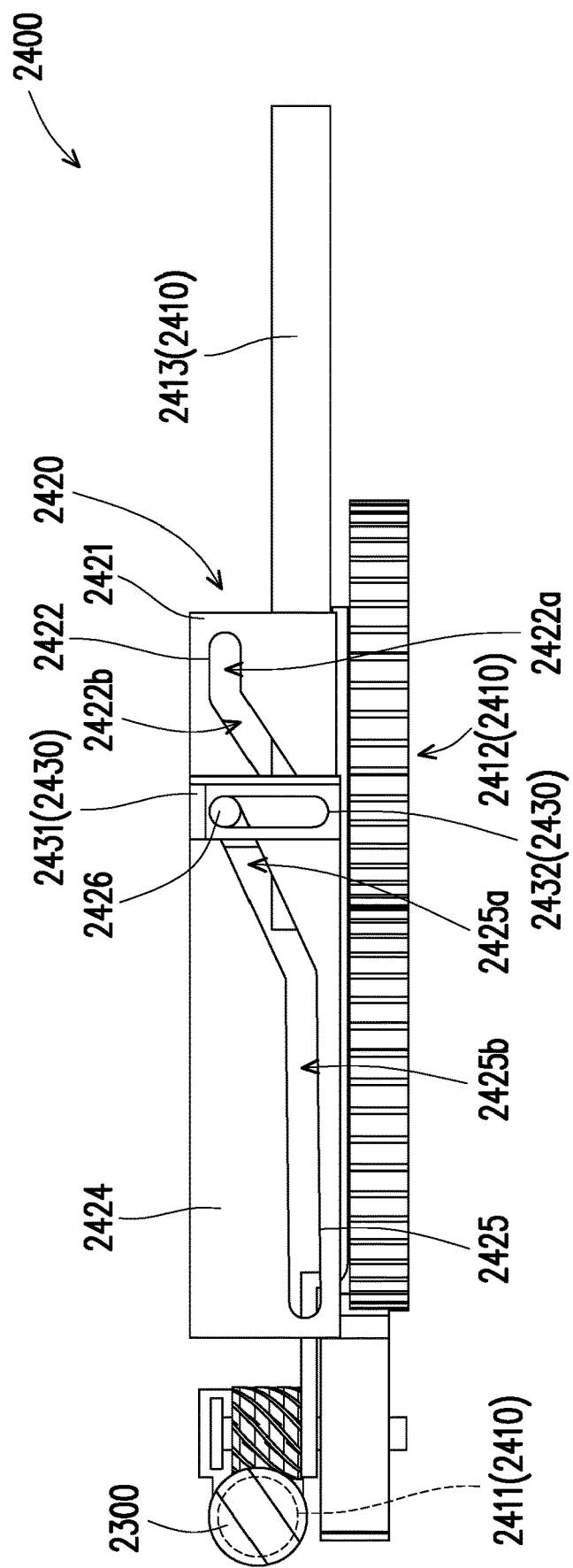
Figure 15:
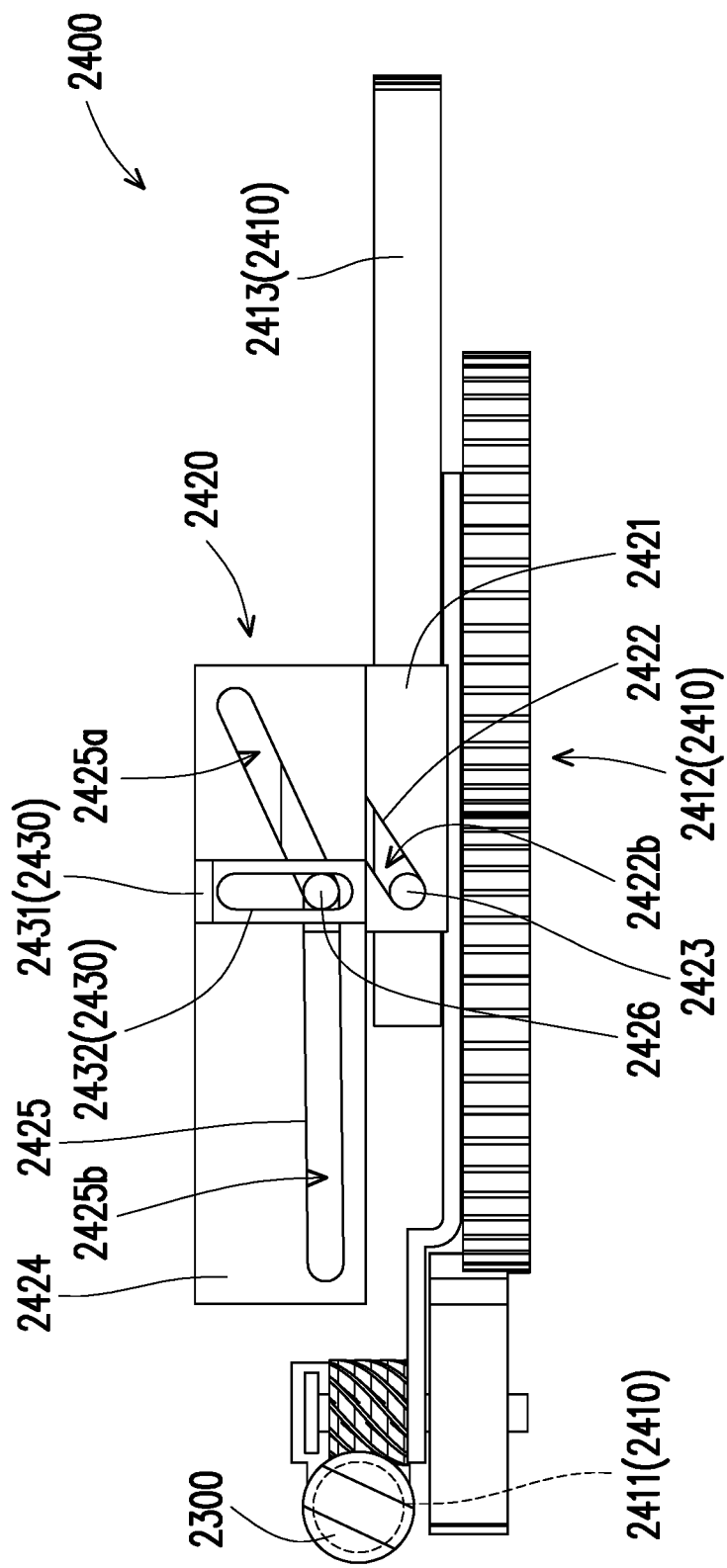
Figure 16:
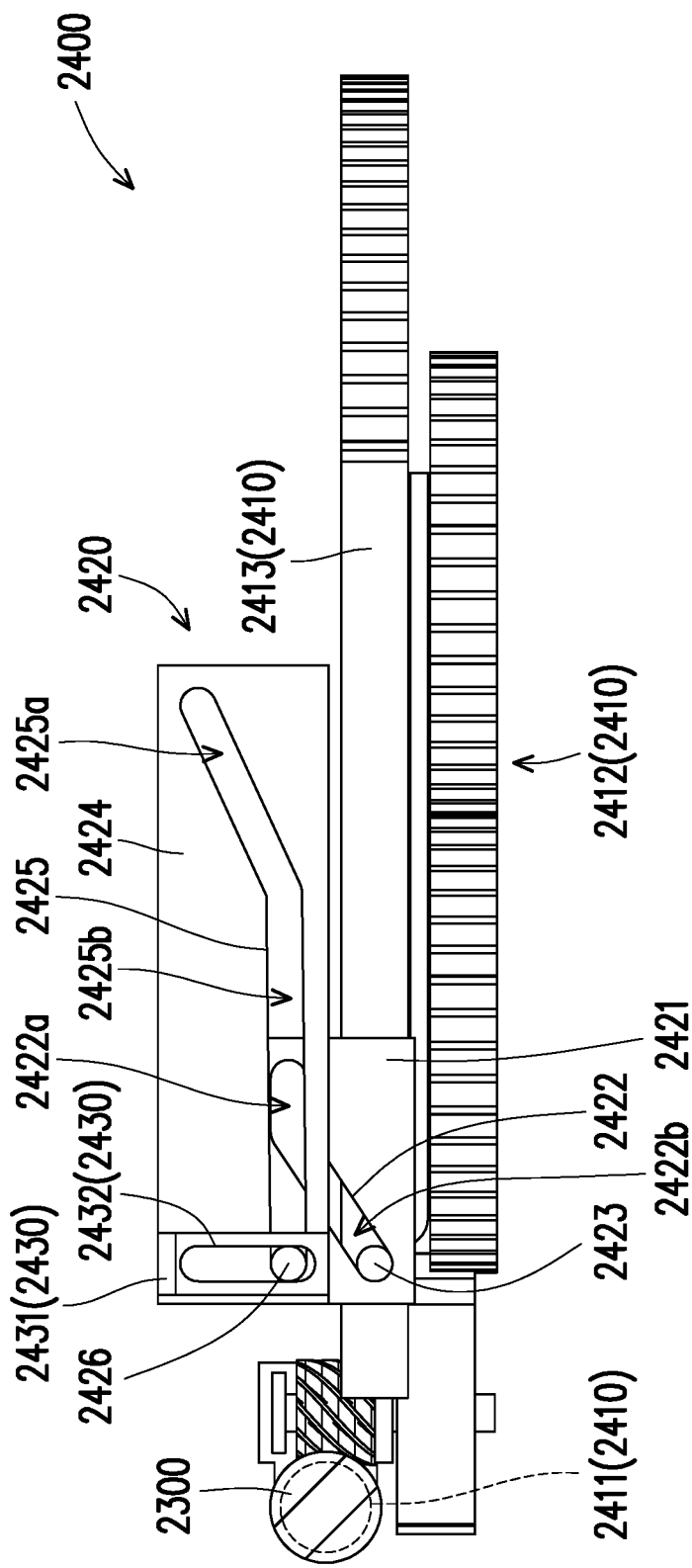

The first translation section 2422*a* is disposed on the first guide groove 2422 to allow the first guide post 2423 to slide therein as shown in FIG. 12 and FIG. 13. The lifting section 2422*b* is disposed on the first guide groove 2422, is connected to the first translation section 2422*a* to allow the first guide post 2423 to slide therein as shown in FIG. 13 and FIG. 14, and is configured to cause the linkage set 2430 to drive the input module 2500 to be lifted or lowered relative to the first body 2100. The translation lifting section 2425*a* is disposed on the second guide groove 2425 to allow the second guide post 2426 to slide therein as shown in FIG. 14 and FIG. 15 and is configured to cause the linkage set 2430 to drive the input module 2500 to move to be close to or away from the pivot module 2300 and cause the linkage set 2430 to drive the input module 2500 to be lifted or lowered relative to the first body 2100. The second translation section 2425*b* is disposed on the second guide groove 2425, is connected to the translation lifting section 2425*a* to allow the first guide post 2423 to slide therein as shown in FIG. 15 and FIG. 16, and is configured to cause the linkage set 2430 to drive the input module 2500 to translate to be close to or away from the pivot module 2300 and cause the linkage set 2430 to drive the input module 2500 to be inclined to the first body 2100.

In the present embodiment, a sum of a height of the lifting section 2422*b* and a height of the translation lifting section 2425*a* is greater than a thickness of the first body 2100. Therefore, a total lifting amount of the input module 2500 may be greater than the thickness of the first body 2100, and the limited internal space of the first body 2100 can be utilized more effectively, so that the foldable electronic device 2000 can be thinner.

In view of the above, according to the foldable electronic device of the invention, when the input module moves away from the pivot module and is parallel to the first body, the second body can be closed relative to the first body to facilitate accommodation and carrying. When the user uses the foldable electronic device in the present embodiment, a junction between the second body and the first body may be blocked by the input module after the input module moves to be close to the pivot module, thereby increasing the aesthetics. In addition, the input module may be lifted by the linkage mechanism to provide a more comfortable operation angle for the user.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A foldable electronic device, comprising:
a first body;
a second body;
a pivot module connected to the first body and the second body, the second body being pivoted on the first body through the pivot module;
a linkage mechanism disposed in the first body and connected to the pivot module, the linkage mechanism further having:
a tooth set disposed in the first body, connected to the pivot module, and configured to be driven by the pivot module;
a guide set disposed in the first body, connected to the tooth set, and configured to be driven by the tooth set, the guide set further having:
a first guide member located in the first body;
a first guide groove disposed on the first guide member;
a first guide post disposed on the tooth set, passing through the first guide groove to cause the first guide member to be movably disposed on the first guide post, and configured to be driven by the tooth set;
a second guide member located in the first body;
a second guide groove disposed on the second guide member; and
a second guide post disposed on the first guide member and passing through the second guide groove; and
a linkage set disposed in the first body and connected to the guide set; and
an input module movably disposed on the first body through the linkage mechanism, wherein
the linkage mechanism is configured to be driven by the pivot module to cause the input module to move to be close to or away from the pivot module and cause the input module to be inclined or parallel to the first body, wherein
the input module is fixed to the linkage set, the linkage set is movably disposed on the second guide post, and the second guide post is configured to be driven by the second guide member to drive the linkage set to cause the linkage set to drive the input module to move relative to the first body.

2. The foldable electronic device according to claim 1, wherein the second guide member is fixed to the first body, and the second guide post passes through the second guide groove to move along the second guide groove, so that the first guide member is guided by the second guide groove and the second guide post to drive the linkage set, and the linkage set drives the input module to move relative to the first body.

3. The foldable electronic device according to claim 2, wherein the second guide groove comprises a first translation section, a translation lifting section, and a second translation section, the first translation section being disposed on the second guide groove and being configured to cause the linkage set to drive the input module to translate to be close to or away from the pivot module, the translation lifting section being disposed on the second guide groove, being connected to the first translation section, and being configured to cause the linkage set to drive the input module to move to be close to or away from the pivot module and cause the linkage set to drive the input module to be lifted or lowered relative to the first body, and the second translation section being disposed on the second guide groove, being connected to the translation lifting section, and being configured to cause the linkage set to drive the input module to translate to be close to or away from the pivot module and cause the linkage set to drive the input module to be inclined to the first body.

4. The foldable electronic device according to claim 3, wherein a height of the translation lifting section is less than a thickness of the first body.

5. The foldable electronic device according to claim 1, wherein the second guide member is movably disposed on the second guide post through the second guide groove, the first guide post passes through the first guide groove to move along the first guide groove, and the second guide post passes through the second guide groove to move along the second guide groove, so that the first guide member is guided by the first guide groove and the first guide post and the second guide member is guided by the second guide groove and the second guide post to drive the linkage set, and the linkage set drives the input module to move relative to the first body.

6. The foldable electronic device according to claim 5, wherein the first guide groove comprises a first translation section and a lifting section, and the second guide groove comprises a translation lifting section and a second translation section, the first translation section being disposed on the first guide groove, the lifting section being disposed on the first guide groove, being connected to the first translation section, and being configured to cause the linkage set to drive the input module to be lifted or lowered relative to the first body, the translation lifting section being disposed on the second guide groove and being configured to cause the linkage set to drive the input module to move to be close to or away from the pivot module and cause the linkage set to drive the input module to be lifted or lowered relative to the first body, and the second translation section being disposed on the second guide groove, being connected to the translation lifting section, and being configured to cause the linkage set to drive the input module to translate to be close to or away from the pivot module and cause the linkage set to drive the input module to be inclined to the first body.

7. The foldable electronic device according to claim 6, wherein a sum of a height of the lifting section and a height of the translation lifting section is greater than a thickness of the first body.

8. The foldable electronic device according to claim 1, wherein the linkage set comprises:
a linkage member, wherein the input module is fixed to the linkage member; and
a pivoting portion disposed on the linkage member, wherein the linkage member is pivoted on the guide set through the pivoting portion to be driven by the guide set.

9. The foldable electronic device according to claim 1, wherein the linkage set comprises:
a linkage member, wherein the input module is fixed to the linkage member; and
a sliding portion disposed on the linkage member, wherein the linkage member is slidably disposed on the guide set through the sliding portion to be driven by the guide set.

10. The foldable electronic device according to claim 1, wherein the tooth set comprises:
an input terminal disposed on the pivot module to be driven by the pivot module;
a transmission terminal disposed in the first body and engaged with the input terminal to be driven by the input terminal; and
an output terminal slidably disposed in the first body and engaged with the transmission terminal to be driven by the transmission terminal, wherein
the linkage set is connected to the output terminal to be driven by the output terminal.

11. The foldable electronic device according to claim 10, wherein a ratio of a tooth quantity of the input terminal to a tooth quantity of the output terminal is greater than or equal to 2 and less than or equal to 20.

12. The foldable electronic device according to claim 10, wherein the tooth set comprises a fixing member fixed to the first body, and the transmission terminal comprises:
a first tooth portion pivoted on the fixing member and engaged with the input terminal;
a second tooth portion fixed to the first tooth portion;
a third tooth portion pivoted on the fixing member and engaged with the second tooth portion;
a fourth tooth portion pivoted on the fixing member and engaged with the third tooth portion;
a fifth tooth portion slidably disposed on the fixing member and engaged with the fourth tooth portion;
a sixth tooth portion pivoted on the fixing member and engaged with the fifth tooth portion; and
a seventh tooth portion fixed to the sixth tooth portion, wherein
the output terminal is slidably disposed on the fixing member and is engaged with the seventh tooth portion to be driven by the seventh tooth portion.

13. The foldable electronic device according to claim 10, wherein the tooth set comprises a fixing member fixed to the first body, and the transmission terminal comprises:
a first tooth portion pivoted on the fixing member and engaged with the input terminal;
a second tooth portion fixed to the first tooth portion;
a third tooth portion pivoted on the fixing member and engaged with the second tooth portion;
a fourth tooth portion pivoted on the fixing member and engaged with the third tooth portion; and
a fifth tooth portion fixed to the fourth tooth portion, wherein
the output terminal is slidably disposed in the first body and is engaged with the fifth tooth portion to be driven by the fifth tooth portion.

* * * * *